(12) United States Patent
Bartram

(10) Patent No.: US 8,458,789 B1
(45) Date of Patent: Jun. 4, 2013

(54) SYSTEM, METHOD AND COMPUTER PROGRAM PRODUCT FOR IDENTIFYING UNWANTED CODE ASSOCIATED WITH NETWORK COMMUNICATIONS

(75) Inventor: Anthony V. Bartram, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 1463 days.

(21) Appl. No.: 11/373,070

(22) Filed: Mar. 9, 2006

(51) Int. Cl.
*G06F 7/20* (2006.01)
*G06F 7/04* (2006.01)

(52) U.S. Cl.
USPC .............................................. 726/22; 726/24

(58) Field of Classification Search
None
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,088,803 A * | 7/2000 | Tso et al. | 726/22 |
| 6,460,050 B1 | 10/2002 | Pace et al. | |
| 6,804,780 B1 * | 10/2004 | Touboul | 713/181 |
| 6,880,087 B1 * | 4/2005 | Carter | 726/23 |
| 6,971,086 B2 | 11/2005 | Reddy et al. | |
| 7,506,155 B1 | 3/2009 | Stewart et al. | |
| 2002/0026605 A1 * | 2/2002 | Terry | 714/37 |
| 2002/0116628 A1 * | 8/2002 | Vignoles et al. | 713/200 |
| 2003/0037138 A1 | 2/2003 | Brown et al. | 709/225 |
| 2004/0181677 A1 * | 9/2004 | Hong et al. | 713/188 |
| 2004/0187010 A1 * | 9/2004 | Anderson et al. | 713/188 |
| 2005/0108707 A1 | 5/2005 | Taylor et al. | |
| 2005/0172339 A1 * | 8/2005 | Costea et al. | 726/22 |
| 2005/0182924 A1 * | 8/2005 | Sauve et al. | 713/154 |
| 2005/0210291 A1 | 9/2005 | Miyawaki et al. | 713/201 |
| 2005/0251489 A1 | 11/2005 | Coley et al. | |
| 2006/0075499 A1 * | 4/2006 | Edwards et al. | 726/24 |
| 2006/0212723 A1 * | 9/2006 | Sheymov | 713/194 |
| 2006/0218635 A1 * | 9/2006 | Kramer et al. | 726/22 |
| 2006/0236100 A1 * | 10/2006 | Baskaran et al. | 713/165 |
| 2006/0294590 A1 * | 12/2006 | Enstone et al. | 726/24 |

FOREIGN PATENT DOCUMENTS

| | | |
|---|---|---|
| WO | 03036550 A1 | 5/2003 |
| WO | 2005114502 A1 | 12/2005 |

OTHER PUBLICATIONS

History-based Access Control for Mobile Code. Edjlali et al. ACM 1998.*
ADC Compatibility Labs, Cupertino, Oct. 10, 2004, retrieved from http://web.archive.org/web/*/http://developer.apple.com/labs/index.html.
NetExam—Channel Partner Training System, Feb. 5, 2006, retrieved from http://web.archive.org/web/20060205071431/http://www.netexam.com/.
Toolwire—The Experiential Learning Company, Feb. 2, 2006, retrieved from http://web.archive.org/web/20060202124032/http://toolwire.com/.

* cited by examiner

*Primary Examiner* — Venkat Perungavoor
(74) *Attorney, Agent, or Firm* — Patent Capital Group

(57) ABSTRACT

A system, method and computer program product are provided including identifying a network communication and determining whether the network communication is initiated by a process associated with unwanted code. As an option, a firewall may identify the network communication and computer code may determine whether the network communication is initiated by a process associated with unwanted code. As an option, in one embodiment, a method may be provided whereby unwanted code identified by network communication may be quarantined and/or the process associated with the unwanted code may be terminated.

18 Claims, 6 Drawing Sheets

SYSTEM, METHOD AND COMPUTER PROGRAM PRODUCT FOR IDENTIFYING UNWANTED CODE ASSOCIATED WITH NETWORK COMMUNICATIONS

FIELD OF THE INVENTION

The present invention relates to detecting unwanted code, and more particularly to detecting unwanted code associated with network communications.

BACKGROUND

Increasingly, computer systems have needed to protect themselves against unwanted data. Such unwanted data has generally taken the form of viruses, worms, Trojan horses, spyware, adware, and so forth. The damage and/or inconvenience capable of being incurred by these types of unwanted data has ranged from mild interference with a program, such as the display of an unwanted political message in a dialog box, to the complete destruction of contents on a hard drive, and even the theft of personal information.

Many mechanisms have been created in order to provide the much needed protection from such unwanted data and the affects thereof. For example, firewalls, intrusion detection software, scanners, spyware, etc. have been used to guard against various types of unwanted data. In use, a firewall will typically block various network communications based on a predetermined set of rules. Still yet, scanners traditionally scan computer code when such code is accessed and/or on an on-demand basis.

To date, however, there has simply been no effective combination of mechanisms introduced to determine whether code associated with a process that initiates identified network communications is unwanted. There is thus a need for overcoming these and/or other problems associated with the prior art.

SUMMARY

A system, method and computer program product are provided including identifying a network communication and determining whether the network communication is initiated by a process associated with unwanted code. As an option, a firewall may identify the network communication and computer code may determine whether the network communication is initiated by a process associated with unwanted code.

DETAILED DESCRIPTION

Figure 1:
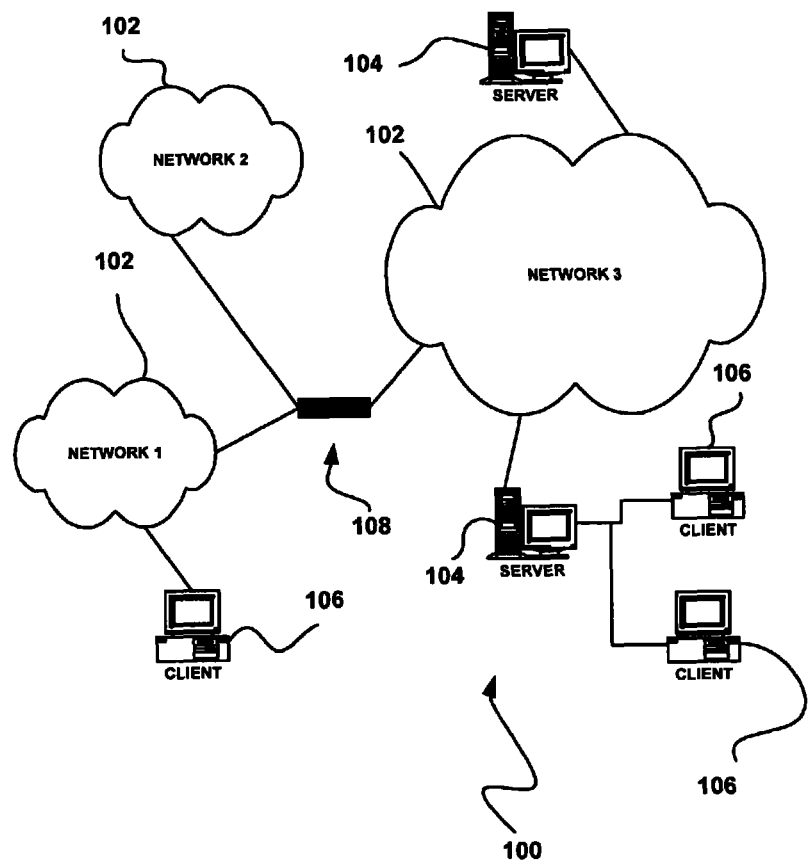
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway 108 is optionally coupled therebetween.

Figure 2:
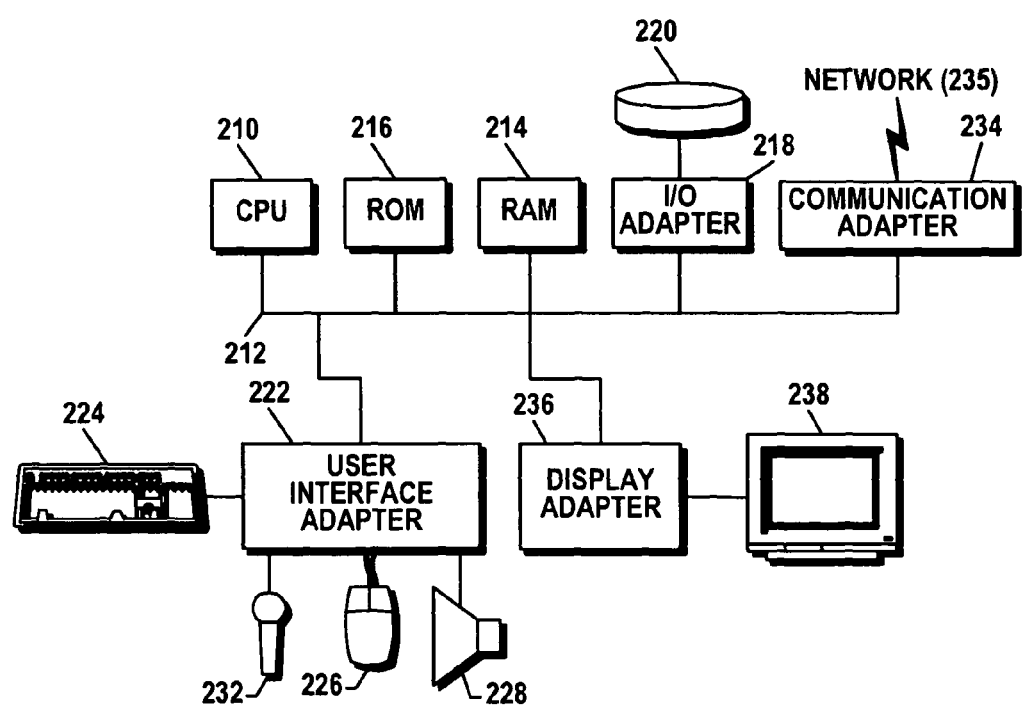
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
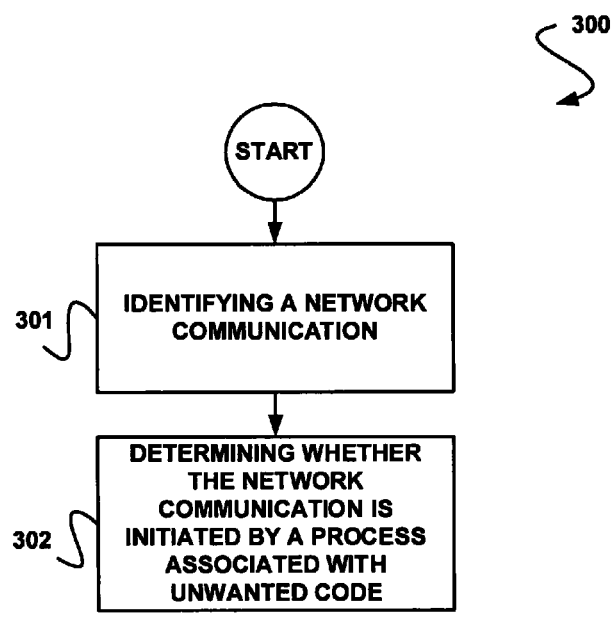
FIG. 3 shows a method for identifying unwanted code associated with network communications, in accordance with one embodiment.

FIG. 3 shows a method 300 for identifying unwanted code associated with network communications, in accordance with one embodiment. As an option, the method 300 may be implemented in the context of the architecture and environment of FIGS. 1 and/or 2. Of course, however, the method 300 may be carried out in any desired environment.

As shown in operation 301, a network communication is identified. The network communication may include any type of communication incoming to a computer (e.g. see, for example, the computers 104, 106 of FIG. 1, etc.), and/or outgoing from the computer, via at least one network (e.g. see, for example, the networks 102 of FIG. 1, etc.). For example, the network communication may include, but is not limited to, the sending/receiving of a message, accessing a Uniform Resource Locator (URL), accessing an Internet Protocol (IP) address, sending/receiving data content, attempting to communicate with the Internet using a program, etc. In addition, the network communication may be identified utilizing a firewall or any other mechanism capable of identifying network communications.

After the network communication is identified in operation 301, it is determined whether the network communication is initiated by a process associated with unwanted code, as shown in operation 302. For example, in one optional embodiment among many, it may be determined whether the network communication is initiated by a non-trusted process or a process prompted by a suspicious program configuration. In an embodiment where a firewall is used in conjunction with operation 301, the unwanted code may optionally be installed on a computer on which the firewall is installed. Furthermore, the unwanted code may include adware, spyware, malicious software (e.g. malware, etc.), and/or any other type of code that may be at least potentially or partly unwanted.

In this way, unwanted code may be detected via an associated network communication regardless of whether a specific signature associated with such unwanted code has been implemented. In the present description, a signature may include data that comprises all or part of unwanted code [or a representation or transformation (e.g. hash, etc.) thereof], such that the signature can be compared against potentially unwanted code to determine if potentially unwanted code is, in fact, unwanted. With respect to the aforementioned transformation, it should be noted that unwanted code may, in some embodiments, be optionally transformed with the intent to obfuscate its content and avoid detection. This transformation may include, but is not limited to a protocol, compression, obfuscation, encryption (that can be broken by trying simple break strategies), etc. A similar approach to break obfuscation can be applied to network communications.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4A:
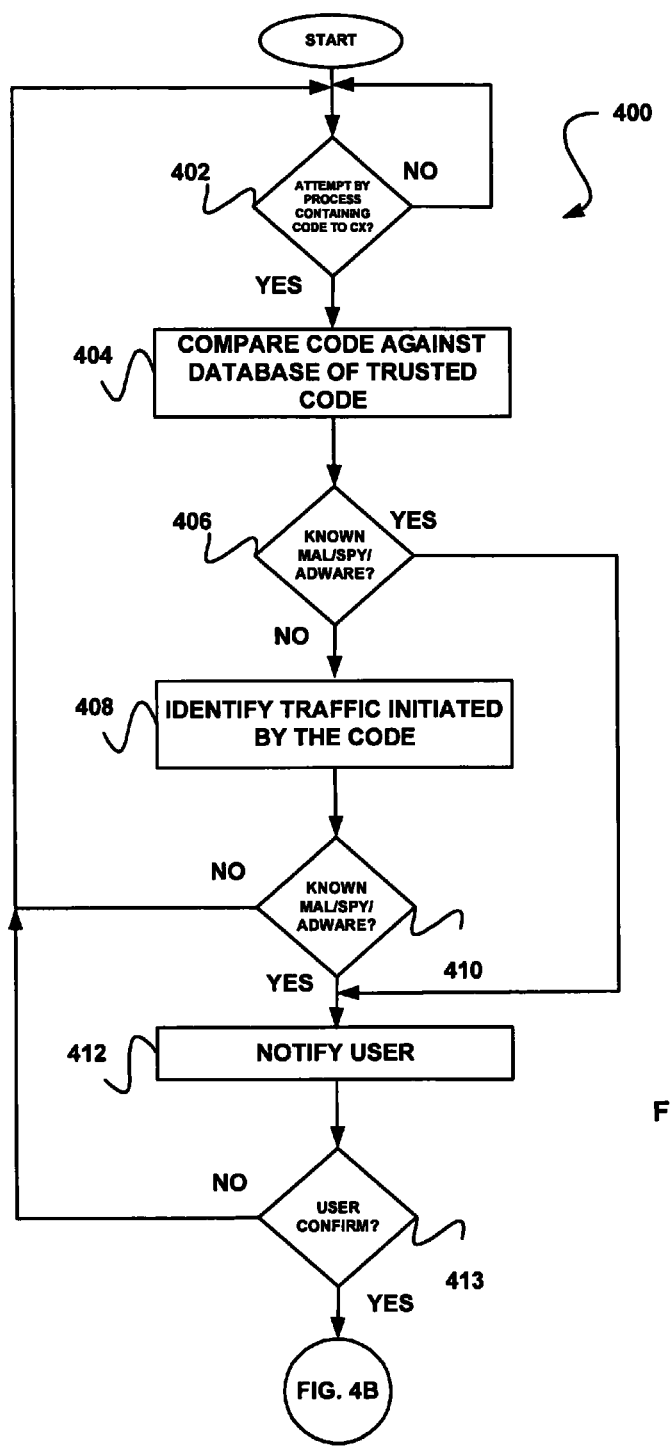
FIGS. 4A-4B show a method for identifying unwanted code associated with network communications, in accordance with another embodiment.
Figure 4B:
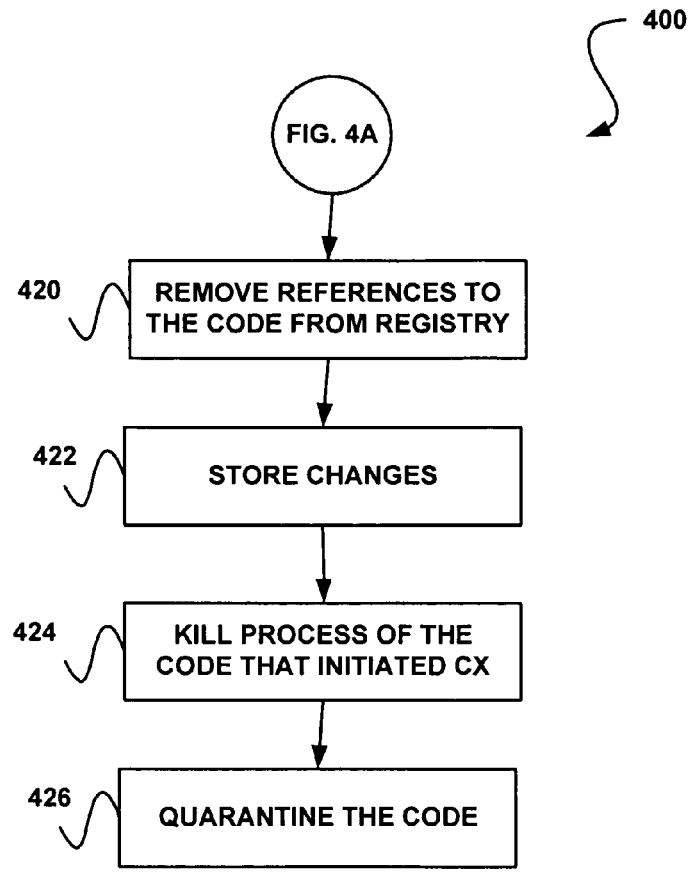

FIGS. 4A-4B show a method 400 for identifying unwanted code executing within a process associated with network communications, in accordance with another embodiment. As an option, the method 400 may be implemented in the context of the architecture, environment, and functionality of FIGS. 1-3. Of course, however, the method 400 may be carried out in any desired environment. Further, the aforementioned definitions may equally apply to the description below.

As shown in decision 402, a determination is made as to whether program code has initiated a process that attempted to send and/or receive communications. Such code may include any program, application, software, etc. capable of running on a computer system, such as the system described with respect to FIG. 2, for example. In one aspect, the code may attempt to send and/or receive communications via a network, such as the Internet.

If it is determined, in operation 402, that code is not attempting to send and/or receive communications, the method 400 continues to monitor attempts made by code to make such communications. If, on the other hand, it is determined in operation 402 that code has attempted to send and/or receive communications via a network, the code whose process attempted such communication is compared against a database of trusted code, as shown in operation 404. Of course, the code whose process that attempted the communication may also (or alternatively) be compared against a database of non-trusted code. In any case, the aforementioned comparison may involve a comparison of known signatures, patterns, rule violations, behavior, heuristics, and/or any other information that results in the identification of unwanted code.

Next, in operation 406 it is determined whether the comparison of operation 404 identifies the code as being associated with unwanted code. For instance, if no match is made between the code and the database of trusted code, the code may be identified as possibly being associated with unwanted code. Alternatively, if a match is made between the code and a database of untrusted code, the code may be identified as being associated with unwanted code.

If the code is identified as being associated with unwanted code, such as adware or spyware, for example, the method 400 advances to operation 412, which will be described in further detail below. If, however, the code is not identified as being associated with unwanted code based on the comparison of operation 404, the network communication that was initiated by a process associated with the suspect code is identified (see operation 408). Again, as described above with reference to FIG. 3, such network communication may include any sort of communication either sent or received by the suspect code.

The method 400 then compares the network communication identified in operation 408 with a database of known unwanted network communications, as shown in operation 410. Again, similar to operations 404-406, the present determination may involve a comparison of known signatures, patterns, rule violations, behavior, heuristics, and/or any other information that results in the identification of the network communication as being unwanted.

For example, the comparison of operation 410 may include a URL or IP address (to which the network communication was directed) to databases of URL or IP addresses, respectively, that are known to be associated with unwanted code. As another example, the comparison of operation 410 may include comparing data within the identified network communication with content known to be associated with unwanted code.

Thus, the network communication itself may be compared against a database of network communications known to be initiated by unwanted code. Furthermore, the comparing of the network communication may be performed after comparing the suspect code associated with the network communication with the database of known unwanted code. If it is determined in operation 410 that the identified network communication is not associated with unwanted code, the method 400 returns to operation 402 where continues monitoring for a next code attempting to send and/or receive communications over a network.

If, however, it is determined in operation 410 that the identified suspect code is associated with unwanted code, a user is notified (see operation 412) that the network communication was initiated by a process associated with unwanted code. In particular, the user may be notified that a potentially unwanted code appears to be installed on the computer. A reaction may then be performed in response to the determination that the network communication was initiated by a process associated with unwanted code. The user may be asked to confirm whether or not to disable the code, which will be described in further detail with respect to FIG. 5.

In addition, the user may be given the option to approve the type of action to take in response to the identification of the unwanted code, such as removing references to the unwanted code from the registry, terminating the code/process, and/or quarantining the unwanted code, for example. More particularly, the user may be asked for confirmation by way of a web browser, a pop-up window, or by any other means capable of receiving a response from a user. If the user does not specify whether to disable the code, or if the user responds that the code should not be disabled, as shown in decision 413, the method 400 proceeds to operation 402 where it continues to monitor any communication attempts made by various code.

If, on the other hand, the user responds that the code should be disabled (see operation 413), references to the code are removed from the registry, as shown in operation 420 of FIG. 4B, such that no future instances of the unwanted code are created due to registry references. The operation 420 only shows one such action that may be taken, namely removing references from the registry. It should be noted, however, that the user could respond with other types of actions to be performed, such as those described above.

Further, in some embodiments, registry locations known to be associated with the unwanted code, such as locations known to be targets of attack by the particular unwanted code, may be identified in order to remove any references to the unwanted code. An example of an identified registry location, in the context of a MICROSOFT WINDOWS operating system, may include HKULM\Software\Microsoft\Windows\CurrentVersion\Run.

As indicated in operation 422, a state associated with the unwanted code may be stored such that any action that was taken can be undone. For instance, if the references to the code were removed from registry locations, a user could utilize the stored state to return to a previous state when the references were still located in the registry. In this way, disabled code can be re-enabled utilizing the stored state.

The method 400 then kills the process that initiated the communication, as shown in operation 424, so that the process associated with the current instance of the unwanted code is terminated. Further, the code is quarantined, as shown in operation 426, to protect a computer environment from the same. Thus, the code that initiated the communication is inactive such that it can no longer send and/or receive network communications.

Figure 5:
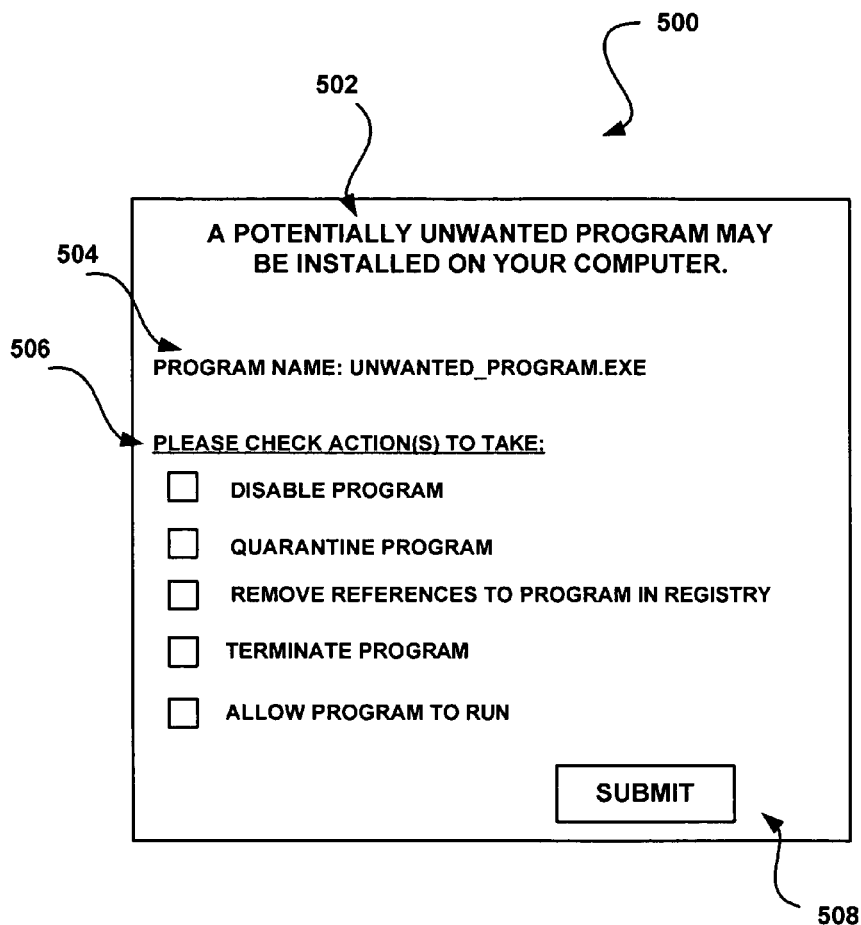
FIG. 5 shows a graphical user interface (GUI) for displaying and receiving information associated with an unwanted program, in accordance with one embodiment.

FIG. 5 shows a graphical user interface (GUI) 500 for displaying and receiving information associated with an unwanted code, in the context of one embodiment. As an option, the GUI 500 may be implemented in the context of the architecture and environment of FIGS. 1-4. Of course, however, the GUI 500 may be carried out in any desired environment.

As described with respect to FIG. 4, the GUI 500 may be presented to a user upon identification of code attempting to communicate via a network. See, for example, operation 412 of FIG. 4. Specifically, the GUI 500 may be presented to a user by a web browser, a pop-up window, or any other mechanism capable of presenting the GUI 500 to a user.

As shown, the GUI 500 includes a notice 502 that informs the user that potentially unwanted code has been installed on the user's computer. Of course, the GUI 500 may be utilized with respect to an administrator's computer to inform an administrator that potentially unwanted code has been installed on one or more user computers.

The GUI 500 also notifies a user of a name 504 of the code that is potentially unwanted, if possible. In this way, the user may decide on an appropriate action to take with respect to the named code 504. As shown, the actions 506 available to the user may include, but are certainly are not limited to, disabling the code, quarantining the code, removing references to the code in the registry of the computer, terminating the code, and/or allowing the code to run.

After the user chooses an appropriate action 506 to take in response to the named potentially unwanted code 504, the user may submit the action selections using a submit icon 508. As another option, the GUI 500 may include an option for the user to choose whether or not to create a restore point prior to performing the selected actions 506. Utilizing the GUI 500, the user is capable of controlling action(s) taken with respect to identified potentially unwanted codes.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems.

Thus, by optionally incorporating the present technology into the cyber-frameworks of the foregoing potential targets, terrorism may be countered by identifying code as including malware, etc., which may be used to combat cyber-terrorism.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method performed by at least one computer, comprising:
    identifying a network communication that includes computer code;
    comparing the computer code to a plurality of trusted codes, wherein a state associated with the computer code is stored such that if the computer code were disabled through a changing of references to registry locations, the computer code can be re-enabled utilizing the state, which was stored;
    comparing content within the network communication to a plurality of stored network communication content known to be initiated by unwanted code when the comparing of the computer code to the plurality of trusted codes indicates that the computer code does not match one of the plurality of trusted codes; and
    determining, utilizing a firewall, whether the network communication is initiated by a process associated with unwanted code based upon the comparison of the content within the network communication to the plurality of stored network communication content.

2. The method of claim 1, wherein the unwanted code is installed on a computer on which the firewall is installed.

3. The method of claim 1, wherein the network communication includes an incoming network communication.

4. The method of claim 1, wherein the network communication includes an outgoing network communication.

5. The method of claim 1, wherein the determining includes comparing suspect code associated with the network communication with a database of known unwanted code.

6. The method of claim 1, wherein the comparing of the network communication to the plurality of stored network communications further includes comparing the network communication with a database of network communications known to be initiated by unwanted code.

7. The method of claim 1, wherein the comparing of the network communication is performed after comparing suspect code associated with the network communication with a database of known unwanted code.

8. The method of claim 1, wherein a user is notified if it is determined that the network communication is initiated by a process associated with unwanted code.

9. The method of claim 8, wherein a reaction is performed in response to the determination that the network communication is initiated by a process associated with unwanted code.

10. The method of claim 9, wherein the user is prompted to approve the reaction.

11. The method of claim 9, wherein the reaction includes removal of references to the unwanted code from a registry.

12. The method of claim 9, wherein the reaction includes termination of the process.

13. The method of claim 9, wherein the reaction includes quarantining the unwanted code.

14. The method of claim 9, wherein the reaction includes storing a state associated with the unwanted code for allowing the reaction to be undone.

15. The method of claim 1, wherein the unwanted code includes at least one of adware, spyware, and malicious software.

16. The method of claim 1, wherein the unwanted code is directed toward terrorism, and the terrorism is countered by the determining.

17. A computer program product embodied on a non-transitory computer readable medium for performing operations, comprising:
   identifying a network communication that includes computer code;
   comparing the computer code to a plurality of trusted codes, wherein a state associated with the computer code is stored such that if the computer code were disabled through a changing of references to registry locations, the computer code can be re-enabled utilizing the state, which was stored;
   comparing content within the network communication to a plurality of stored network communication content known to be initiated by unwanted code when the comparing of the computer code to the plurality of trusted codes indicates that the computer code does not match one of the plurality of trusted codes; and
   determining, utilizing a firewall, whether the network communication is initiated by a process associated with unwanted code based upon the comparison of the content within the network communication to the plurality of stored network communication content.

18. A system, comprising:
a firewall that includes a processor, the system being configured for:
   identifying a network communication that includes computer code;
   comparing the computer code to a plurality of trusted codes, wherein a state associated with the computer code is stored such that if the computer code were disabled through a changing of references to registry locations, the computer code can be re-enabled utilizing the state, which was stored;
   comparing content within the network communication to a plurality of stored network communication content known to be initiated by unwanted code when the comparing of the computer code to the plurality of trusted codes indicates that the computer code does not match one of the plurality of trusted codes; and
   determining, utilizing a firewall, whether the network communication is initiated by a process associated with unwanted code based upon the comparison of the content within the network communication to the plurality of stored network communication content.

\* \* \* \* \*